Oct. 6, 1959   E. A. GUILLEMIN ET AL   2,907,222
SERVO SYSTEM HAVING PRECISION REVERSIBILITY
Filed Nov. 25, 1953
2 Sheets-Sheet 2

INVENTORS
ERNST A. GUILLEMIN
WILLIAM K. LINVILL
BY
ATTORNEY

United States Patent Office 2,907,222
Patented Oct. 6, 1959

2,907,222

SERVO SYSTEM HAVING PRECISION REVERSIBILITY

Ernst A. Guillemin, Wellesley, and William K. Linvill, Belmont, Mass., assignors to Raytheon Company, a corporation of Delaware Application November 25, 1953, Serial No. 394,270

12 Claims. (Cl. 74—409)

This invention relates to servo systems, and particularly to the control of the transmission of torque to a driven element, or load, to move the latter in opposite directions, alternately, as dictated by control signals applied to a driving motor.

The invention is concerned with the problem of backlash, or play, that is characteristic of mechanical drives such as gear trains, screw translating mechanisms, and the like, constituting the path of torque transmission between a driving servo unit and a part to be positioned, or shuttled between limits as, for example, a work-engaging tool.

When a transmission of the character described includes, among other parts, a carriage or platen reciprocable by the rotation of an actuating screw, first in one direction and then the other, each reversal of rotation creates a problem in the matter of maintaining correct positional relationship between driving and driven components. If no backlash compensation is provided, there will be a brief idling period at the outset of the reverse motion of the driving component. During this idling period, whose duration is a function of the extent of mechanical play, or tolerance, between inter-engaging drive surfaces, the driven element fails to move synchronously with the prime mover, and inaccuracy thereby results.

The present invention, when applied to a servo system having backlash, makes possible the initiation of a backlash corrective factor in advance of any substantial backlash displacement. Moreover, it does so without in any way disabling, even momentarily, the normal functioning of the servo system, there being no substitution or addition of an auxiliary signal input to the normal driving motor.

In this connection a characteristic of the invention is the provision of a servo system having inherent therein the capacity to maintain precise driving relationship between driving and driven components in both directions of drive, and throughout drive reversing operations, including the backlash take-up portion of the reversing process.

More specifically, the invention provides a servo drive characterized by a torque multiplying gear train having inherent therein the capacity to apply a backlash compensating torque in automatic response to the reception of a drive reversing impulse, and in advance of any appreciable relative displacement as between the driving and driven ends of the drive, the application of compensating torque being effective to rapidly accelerate the driven end of the drive and thus eliminate the possibility of such appreciable relative displacement between driving and driven components before it has had an opportunity to occur.

The invention is herein illustrated and described as incorporated in a reversible servo drive in which the driving motor is effective to maintain linearity of control of the servo system under all driving conditions, including periods of backlash take-up, the motor's operation being regulated exclusively by a single control instrumentality, or signal, and without resort to special reversal-actuated control signals of any kind.

Figure 1:
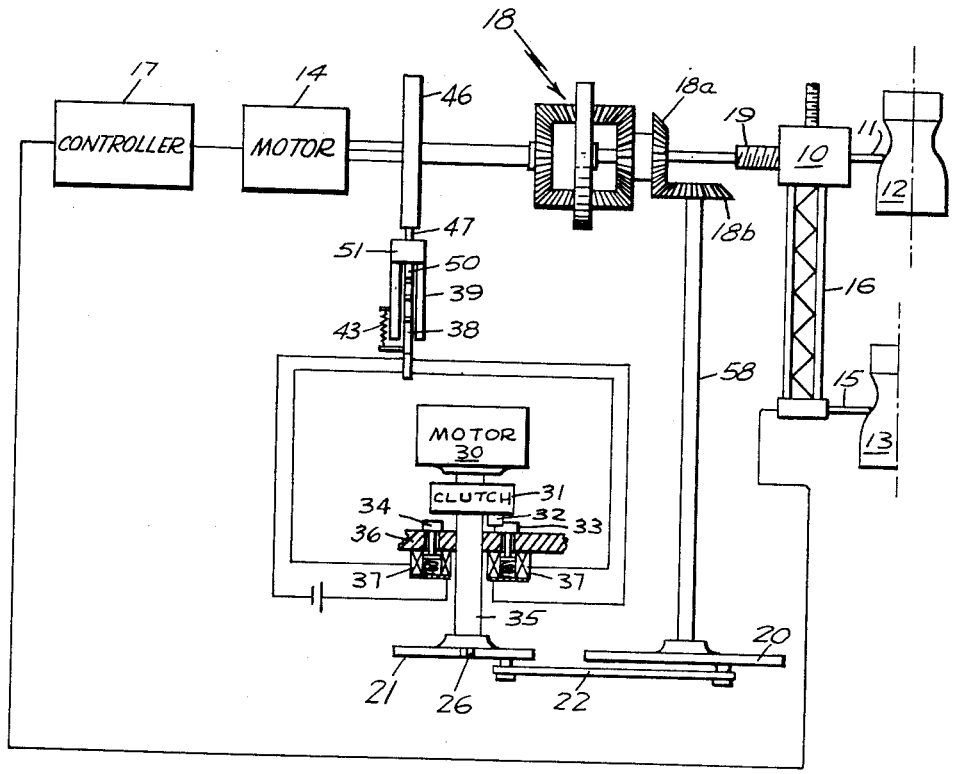
Fig. 1 is a schematic representation of the invention as applied to the positioning of a work-engaging tool.

In these drawings there is shown a servo system for transmitting cross-feeding pressure to a carriage 10 to move the carriage-mounted tool 11 transversely of its longitudinal feed path and thereby cause it to perform work upon an engaged workpiece 12 in such a manner that the finished piece will conform in contour to that of the template indicated at 13 in Fig. 1. The driving servo motor 14 varies its speed in accordance with the control signals imparted thereto by the action of stylus 15 as the latter rides upon the surface of template 13, the said stylus being driven on the longitudinal course of carriage 10, by reason of mechanical connections 16, and being transversely shiftable by its inter-engagement with the rotating template 13 as it moves longitudinally along the template's surface. Such a system is more fully described in U.S. Patent No. 2,559,575 to Fryklund.

It will be understood that stylus 15 includes a variable resistor or equivalent means for varying the character of the signal delivered to motor 14, by way of electronic amplifier and control unit 17, so that the effect of the motor drive will be to vary the position of the tool 11 continuously, and in conformity with the course dictated by action of template 13 upon stylus 15, the rotation of motor 14 being translated into rectilinear motion of tool carriage 10 by the action of the interposed gear train 18 and cross-feed lead screw 19. Such a stylus is more fully described in U.S. Patent No. 2,470,244 to Fryklund.

Figure 3:
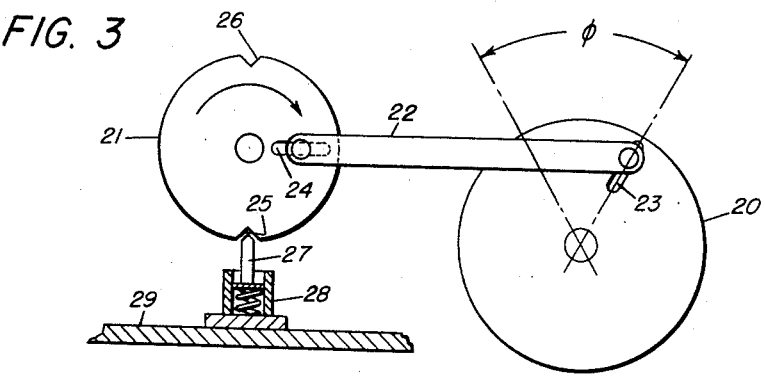
Fig. 3 is a plan view of the actuating portion of the transmission control mechanism.

The novel method for maintaining linearity of the drive from motor 14 to carriage 10, and eliminating backlash effects, comprises the step of varying the torque-applying characteristics of the gear train 18 by automatic means operating at the instant when the motor 14 sustains a direction reversing impulse. To facilitate such torque variation, the gear train 18 is conveniently of a differential type, although other types of torque converters could, of course, be substituted. In normal driving, with the torque being applied in a given direction, one of the gears is constrained against rotation by suitable mechanical means, which constraint is thereafter removed, whereupon the normally constrained gear is positively driven through an arc of adjustably predetermined extent by auxiliary driving means automatically coupled to the gear train upon occurrence of the reverse rotational impulse. As shown in Figs. 1 and 3, the normally constrained gear 18a meshes with an auxiliary gear 18b having a shaft type of extension 58 terminating in a disc 20, and the constraint against rotation is supplied by linking the disc 20 to a normally constrained companion disc 21, as by a connecting rod 22 pivoted at its ends within radial slots 23, 24 on the respective discs, the connecting rod 22 also serving as the auxiliary torque-applying agency upon release of disc 21. Diametrically opposed notches 25, 26 in disc 21 are engageable successively by a detent 27 spring-urged thereagainst and slidable within a hollow cylindrical post 28 secured to a suitable fixed support 29.

In normal (unidirectional) driving there is no rotative effort applied to disc 21; therefore, the light spring load upon detent 27 is sufficient to restrain both discs 21 and 20 and thus hold gear 18a of the differential gear train against rotation. However, upon occurrence of a reverse rotational impulse, the disc 21 is subjected to rotative effort, sufficient to start it in motion against the relatively light resistance of the detent, which thereupon yields to permit the rotation. This rotative effort, applied by instrumentalities now to be described, is discontinued just prior to arrival of the diametrically opposite notch at the angular position of the detent 27, hence the detent again becomes effective as a disc and gear restraining device by reason of registry with the said second notch of the disc 21. Thus the degree of rotation of disc 20 is limited to the arc indicated by the letter $\phi$ in Fig. 3, and the rotation of gear 18a is limited to a corresponding amount, which is of the same magnitude for each successive cycle, but may be pre-set to a different magnitude by adjusting the rod ends in relation to the slots 23 and 24.

The means for rotating the disc 21 through a half revolution, on each cycle of rotation reversal by motor 14, will now be described. Referring to Fig. 1, an auxiliary motor 30 running continuously in a single direction, at any desired speed, rotates a slip clutch 31 whose driven element is normally restrained against rotation by reason of the inter-engagement of a clutch pin 32 and one or the other of a pair of obstructing lugs 33, 34 adapted to be spring-urged into the path of the clutch pin 32 and supported on a fixed plate 36 constituting part of the housing of the mechanism. Each of these lugs has an electrical solenoid 37 associated therewith, and, upon momentary energization of either solenoid by the operation of the switches associated with disc 46, the related lug 33 or 34 is rotated about the axis of the solenoid (along with the solenoid armature) against its spring bias through an arc of sufficient extent to permit passage of the clutch pin 32. For an example of such a rotatable relay armature, reference may be made to United States Patent No. 1,920,135 granted to J. W. Allen on July 25, 1933, and disclosing an armature having ninety degrees of rotation when its field is energized. The clutch 31 is thereby freed for rotation through a half revolution, at which point the clutch pin 32 strikes the remaining or unoperated lug (34 or 33) to block further rotation of the driven element of the clutch, and the disc 21, being mechanically coupled to the driven element of the clutch by shaft 35, is thereby brought to a stop just as detent 27 snaps into a disc notch.

During the above-described half revolution of disc 21, backlash correcting torque is applied to the gear train 18 by way of driving rod 22, disc 20, shaft 58, and intermeshed gears 18b and 18a, the said correcting torque supplementing that which the motor 14 may concurrently supply in performance of its normal servo function. This corrective torque application moves the gear train through an angle proportional to the half-revolution angle traversed by the disc 21, the proportion of movement depending upon the ratio established by the adjustment of the rod ends in slots 23 and 24, which adjustment in turn depends upon the amount of backlash inherent in the transmission system.

In the manner described, a relatively high acceleration component is caused to be superposed upon the normal, continuously acting moderate acceleration component represented by the motor 14, this relatively high auxiliary component being added automatically upon each reversal of the motor 14 and thereby relieving the motor 14 of the extra load which reversal-induced backlash would otherwise impose. Important in this connection is the fact that motor 30 rotates continuously, and may actually be a relatively small motor incorporating a flywheel or equivalent relatively high inertia factor capable of taking care of this intermittent mechanical load by reason of its stored kinetic energy. Since only the inertia of the two discs 20 and 21, and connecting rod 22, need be overcome, the degree of acceleration attainable is relatively high, and backlash correction is accomplished with corresponding rapidity, and before there is time for any appreciable reverse rotation of motor 14.

Figure 2:
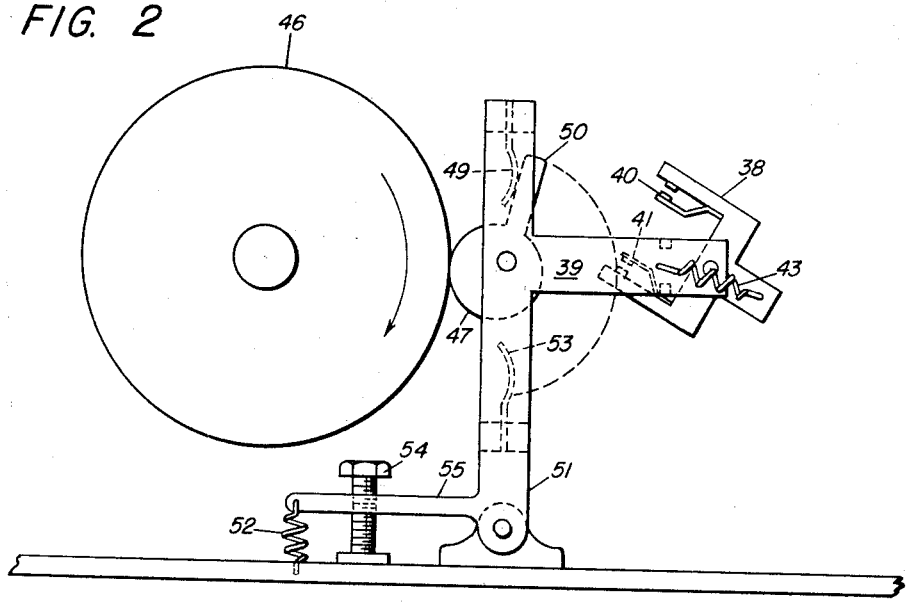
Fig. 2 is a transverse elevation view of the reversal responsive detection portion of the transmission control mechanism.

The means for energizing, momentarily, the appropriate one of the two lug-turning solenoids is shown in Fig. 2 as taking the form of a shuttle element 38 pivotally mounted on a bracket 39 and carrying two sets of contacts, 40 and 41, in circuit with the said two solenoids 37 and sources 60 and 61 of potential, so that each set of contacts operates to energize the particular solenoid associated therewith, the energization being of only momentary duration, however, as the tension of the outer contact leaf of each set as such as to break the circuit as soon as the shuttle element reaches its opposite position, after each cyclic swing, aided by snap spring 43. The cyclic swings are produced only when there is a reverse rotational impulse exerted by the driving motor 14. The manner in which such impulse is communicated to shuttle element 38 will now be described.

A relatively large wheel 46 (Fig. 2) of fairly soft material is mounted on the motor shaft and engages frictionally with a relatively small and slightly eccentric roller 47 in such a way that, in the position shown, the roller's rotation tends to disengage it from contact with the wheel 46. Complete disengagement, however, is prevented by reason of the restraining effect of flexible stop finger 49 upon the arm 50 extending radially from the roller 47. When the pressure of arm 50 upon stop finger 49 equalizes with the pressure between the soft "composition" wheel 46 and the roller, a steady condition of slippage is established. This condition continues until there is a reverse rotational impulse exerted through wheel 46 upon roller 47. When this happens, the light pressure between the wheel 46 and the roller 47 is effective to cause the roller to start rotation in a direction to carry the arm 50 away from stop finger 49. As such rotation begins, the slight eccentricity of the roller is sufficient to rock the entire roller mounting about its pivotal support 51, causing a stressing of relatively heavy tension spring 52 and hence greatly increasing the pressure between wheel 46 and roller 47. Meanwhile arm 50 has rotated into engagement with the obstructing side of the shuttle yoke 38, and with the additional impetus imparted by the increasing pressure between the wheel and roller, the arm 50 delivers a strong thrust against said yoke 38, and throws it to its opposite inclination, the snap spring providing the follow-through to this shifting of the yoke 38. At the outset of this shift, as heretofore noted, the contacts 41 (or 40, as the case may be) close momentarily to energize the appropriate one of the two lug-turning relays 37, to initiate the gear shift action heretofore described.

When roller arm 50 reaches the opposite limit of its swing, as defined by the flexible stop finger 53, the roller will have rotated to the point where, in view of the slight eccentricity of its mounting, there will be a release of the greater portion of the pressure set up between the wheel and roller during the actual swing of the roller. Hence the wheel 46 will be free to continue rotation in the new direction with only a slight degree of frictional opposition from roller 47. A screw 54 is provided adjacent foot 55 of the roller mounting to permit adjustment of the frictional pressure so that the load on the motor, due to the friction of roller 47, may be maintained at the minimum necessary to insure proper throw-over of the shuttle 38 when the motor reverses.

It will be apparent from the foregoing description that the system operates to separate completely the action of backlash compensation from the normal functioning of the servo loop. This is done by independently applying a torque converting force to eliminate backlash whenever necessary, thus allowing the servo system to remain fully effective at all times, with no interruptions even during direction reversing periods.

While the invention has been described by reference to a particular embodiment involving control of a tool feed carriage, it is to be understood that the principles disclosed may be applied to equivalent drive controls, and to any equivalent driving mechanism using a reversible prime mover, whether of the servo or other type. Likewise, the expression "slip clutch," as used herein, is to be understood as embracing any known type of clutch adapted to act as a positive drive when rotation of the drive element is permitted, as by the withdrawal of the first lug 33, and to disengage when rotation of the driven element is interrupted, as by contact of the clutch pin 32 with the second lug 34. Similarly, it is to be understood that the invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a driving mechanism, a prime mover, a gear train driven from said prime mover, a friction wheel also driven from said prime mover, a switch mechanism biased to one of two extreme positions by the rotation of said friction wheel in one direction, means operated upon reversal of said friction wheel to throw said switch mechanism to its other extreme position, a supplementary prime mover and electromagnetic clutch means responsive to such switch reversal to connect said supplementary prime mover to said gear train and so to vary the driving torque normally prevailing in said gear train.

2. In a driving mechanism, a driving motor, a gear train driven by said motor having one component normally restrained against rotation, means including a motor-driven slip clutch for rotating said component through an arc of predetermined extent, means normally holding the driven element of said slip clutch against rotation, and reversal responsive means for momentarily withdrawing said holding means, whereupon said clutch driven element is caused to rotate and drive said gear train component through said predetermined arc.

3. In a driving mechanism, a first driving motor rotatable in opposite directions alternately, a motor-driven transmission subject to backlash upon each reversal of the motor drive, and backlash compensation means comprising a second motor and a slip clutch driven by said second motor effective to take up all mechanical play in said transmission as the direction of rotation of said first motor reverses.

4. In a driving mechanism, a first driving motor rotatable in opposite directions alternately, a motor-driven transmission subject to backlash upon each reversal of the motor drive, and backlash compensating means comprising a second motor and a slip clutch driven by said second motor effective to take up all mechanical play in said transmission as the direction of rotation of said first motor reverses, said compensating means further comprising a stop element normally causing said clutch to slip, and reversal responsive means for withdrawing said stop element, whereupon said clutch becomes effective as a torque transmitting element.

5. In a driving mechanism, a first driving motor rotatable in opposite directions alternately, a motor-driven transmission subject to backlash upon each reversal of the motor drive, and backlash compensating means comprising a second motor and a slip clutch driven by said second motor effective to take up all mechanical play in said transmission as the direction of rotation of said first motor reverses, said compensating means further comprising a disc rotatable between pre-set stop positions in response to rotation of said slip clutch, and means restraining rotation of said disc during periods of clutch slippage.

6. In a drivng mechanism, a first driving motor rotatable in opposite directions alternately, a motor-driven transmission subject to backlash upon each reversal of the motor drive, and backlash compensating means comprising a second motor and a slip clutch driven by said second motor effective to take up all mechanical play in said transmission as the direction of rotation of said first motor reverses, said compensating means further comprising a stop element normally causing said clutch to slip, and reversal responsive means for withdrawing said stop element, whereupon said clutch becomes effective as a torque transmitting element, said reversal responsive means comprising electromagnetic stop withdrawing means and a reversal-operated switch mechanism controlling energization of said electromagnetic means.

7. In combination with first and second motors, a slip clutch having a driving element actuated by the first of said motors and a normally restrained driven element, driving means connected from said second motor to a load member for driving said load member, stop means engageable with the driven element of said clutch to prevent its rotation during rotation of the second motor in either direction, and means responsive to a reversal in the direction of rotation of said second motor to cause withdrawal of said stop means from the path of rotation of the driven element of said clutch.

8. In combination with first and second motors, a slip clutch having a driving element actuated by the first of said motors and a normally restrained driven element, driving means connected from said second motor to a load member for driving said load member, stop means engageable with the driven element of said clutch to prevent its rotation during rotation of the second motor in either direction, and means responsive to a reversal in the direction of rotation of said second motor to cause withdrawal of said stop means from the path of rotation of the driven element of said clutch, said withdrawing means further comprising electromagnetic means normally deenergized, and means for momentarily energizing said electromagnetic means as said second motor reverses.

9. In combination with first and second motors, a slip clutch having a driving element actuated by the first of said motors and a normally restrained driven element, driving means connected from said second motor to a load member for driving said load member, stop means engageable with the driven element of said clutch to prevent its rotation during rotation of the second motor in either direction, and means responsive to a reversal in the direction of rotation of said second motor to cause withdrawal of said stop means from the path of rotation of the driven element of said clutch, said withdrawing means further comprising two-position inertia means controlling operation of said withdrawing means, and means for shifting said inertia means from one of its two positions to the other as said second motor reverses.

10. In combination with first and second motors, a slip clutch having a driving element actuated by the first of said motors and a normally restrained driven element, driving means connected from said second motor to a load member for driving said load member, stop means engageable with the driven element of said clutch to prevent its rotation during normal rotation of the second motor in a given direction, and electromagnetic means responsive to a reversal in direction of rotation of said second motor for withdrawing said stop means from the path of rotation of the driven element of said clutch.

11. In combination with first and second motors, a slip clutch having a driving element actuated by the first of said motors and a normally restrained driven element, driving means connected from said second motor to a load member for driving said load member, stop means engageable with the driven element of said clutch to prevent its rotation during normal rotation of the second motor in a given direction, and electromagnetic means responsive to a reversal in direction of rotation of said second motor for withdrawing said stop means from the path of rotation of the driven element of said clutch momentarily as the direction of motor rotation reverses.

12. In combination with first and second motors, a slip clutch having a driving element actuated by the first of said motors and a normally restrained driven element, driving means connected from said second motor to a load member for driving said load member, stop means engageable with the driven element of said clutch to prevent its rotation during normal rotation of the second motor in either direction, and electro-magnetic means responsive to a reversal in direction of rotation of said second motor for withdrawing said stop means from the path of rotation of the driven element of said clutch, said electro-magnetic means including stop restoring means effective to re-set the stop means after momentary withdrawal thereof.

References Cited in the file of this patent

UNITED STATES PATENTS

| | | |
|---|---|---|
| 2,116,593 | Bowier | May 10, 1938 |
| 2,196,231 | Ridgway | Apr. 9, 1940 |
| 2,302,575 | Romaine et al. | Nov. 17, 1942 |
| 2,399,329 | Beauregard | Apr. 30, 1946 |
| 2,476,214 | Parsons | July 12, 1949 |
| 2,533,043 | Price | Dec. 5, 1950 |
| 2,537,083 | Peoples | Jan. 9, 1951 |
| 2,640,176 | Colosi | May 26, 1953 |
| 2,717,979 | Gardiner | Sept. 13, 1955 |
| 2,773,432 | De Vlieg | Dec. 11, 1956 |